US008640576B2

(12) United States Patent
Jorg

(10) Patent No.: US 8,640,576 B2
(45) Date of Patent: Feb. 4, 2014

(54) PRODUCTION MACHINE FOR NON-CIRCULAR WORK PIECES

(75) Inventor: Reiner Jorg, Schramberg (DE)

(73) Assignee: J.G. Weisser Sohne GmbH & Co. KG, St. Georgen im Schwarzwald (DE)

( * ) Notice: Subject to any disclaimer, the term of this patent is extended or adjusted under 35 U.S.C. 154(b) by 373 days.

(21) Appl. No.: 13/058,289

(22) PCT Filed: Aug. 7, 2009

(86) PCT No.: PCT/EP2009/005742
§ 371 (c)(1),
(2), (4) Date: Feb. 9, 2011

(87) PCT Pub. No.: WO2010/017916
PCT Pub. Date: Feb. 18, 2010

(65) Prior Publication Data
US 2011/0138976 A1 Jun. 16, 2011

(30) Foreign Application Priority Data

Aug. 12, 2008 (DE) .......................... 10 2008 038 728

(51) Int. Cl.
*B23B 37/00* (2006.01)
(52) U.S. Cl.
CPC ............... *B23B 37/00* (2013.01); *Y10S 82/904* (2013.01)
USPC .................................. 82/133; 82/904; 310/15
(58) Field of Classification Search
USPC ............... 82/132, 133, 134, 904; 310/12.04, 310/12.31, 12.32, 15, 17; 318/135
See application file for complete search history.

(56) References Cited

U.S. PATENT DOCUMENTS

| 5,504,407 A * | 4/1996 | Wakui et al. ............. 318/568.17 |
| 6,744,155 B1 * | 6/2004 | Stoiber .......................... 310/15 |
| 2006/0081097 A1 * | 4/2006 | Schneider et al. .............. 82/158 |

FOREIGN PATENT DOCUMENTS

| DE | 19810996 | 9/1999 |
| EP | 0333128 | 9/1989 |

OTHER PUBLICATIONS

M. Weck, J. Hennig, Entwicklung und Einsatz einer hochdynamischen Werkzeugzustelleinheit mit hydrostatischer Lagerung, Final Report, Ultraprazisionstechnik E.V., Oct. 2002.

* cited by examiner

*Primary Examiner* — Andrea Wellington
*Assistant Examiner* — Alan Snyder
(74) *Attorney, Agent, or Firm* — Volpe and Koenig, P.C.

(57) ABSTRACT

A production machine for non-circular workpieces provided with a tool feed unit (1) comprising a tool carrier (2) for receiving the tool and a compensation body (3) for impulse decoupling. The work movement of the tool carrier (2) can be effected by a drive (4) acting between the tool carrier (2) and the compensation body (3). The tool carrier (2) is supported by rolling bodies (5) and the compensation body (3) is suspended via elastically deformable guide elements (6) at a housing part (7) of the tool feed unit (1). A mass of the compensation body (3) is larger than a mass of the tool carrier (2) carrying the tool so that the working movements of the tool carrier (2) effect compensation strokes of the compensation body (3) that are only within the range of the elastic deformation of the guide elements (6). The guide elements (6) thus effect the guiding and resetting of the compensation body (3).

18 Claims, 3 Drawing Sheets

Figure 1:
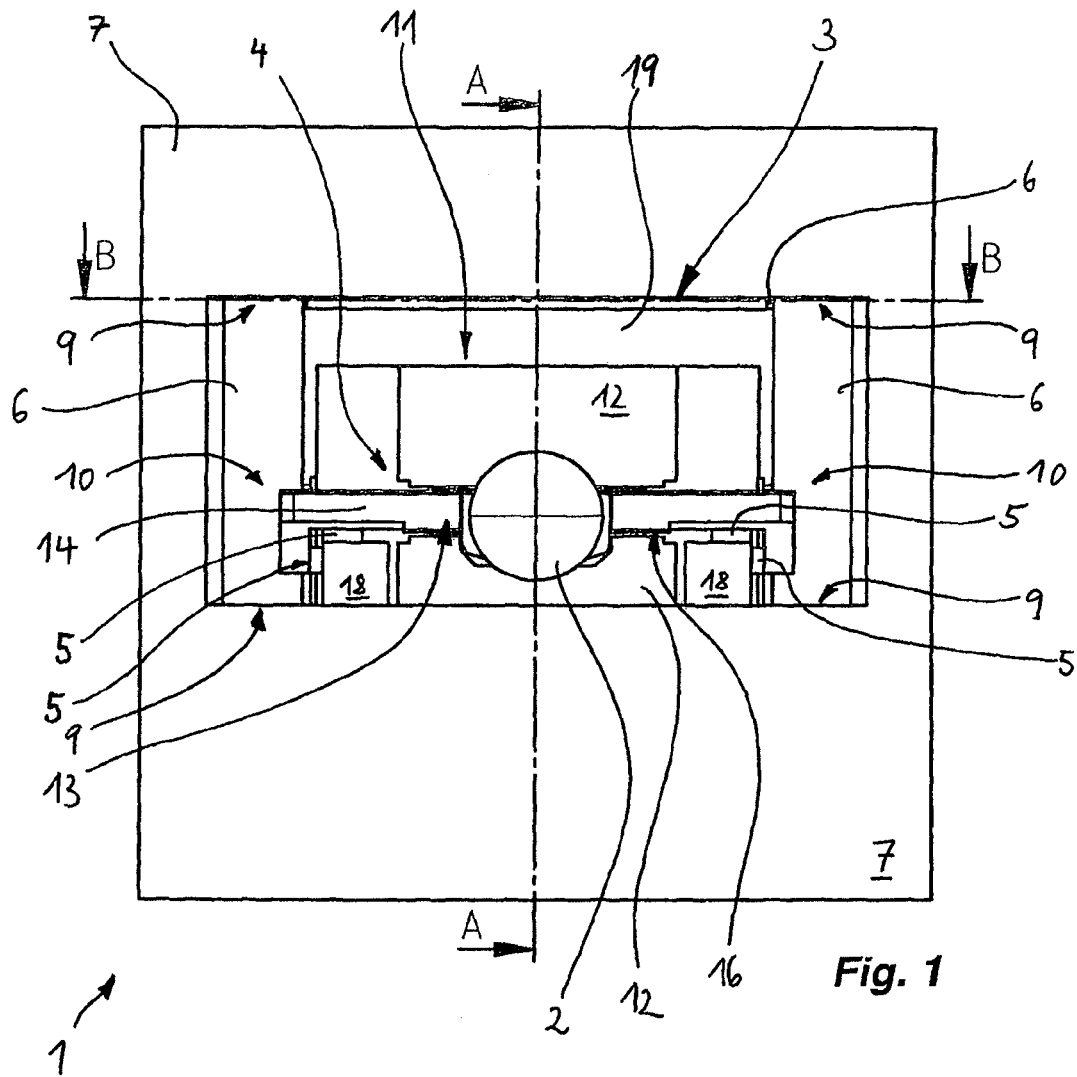

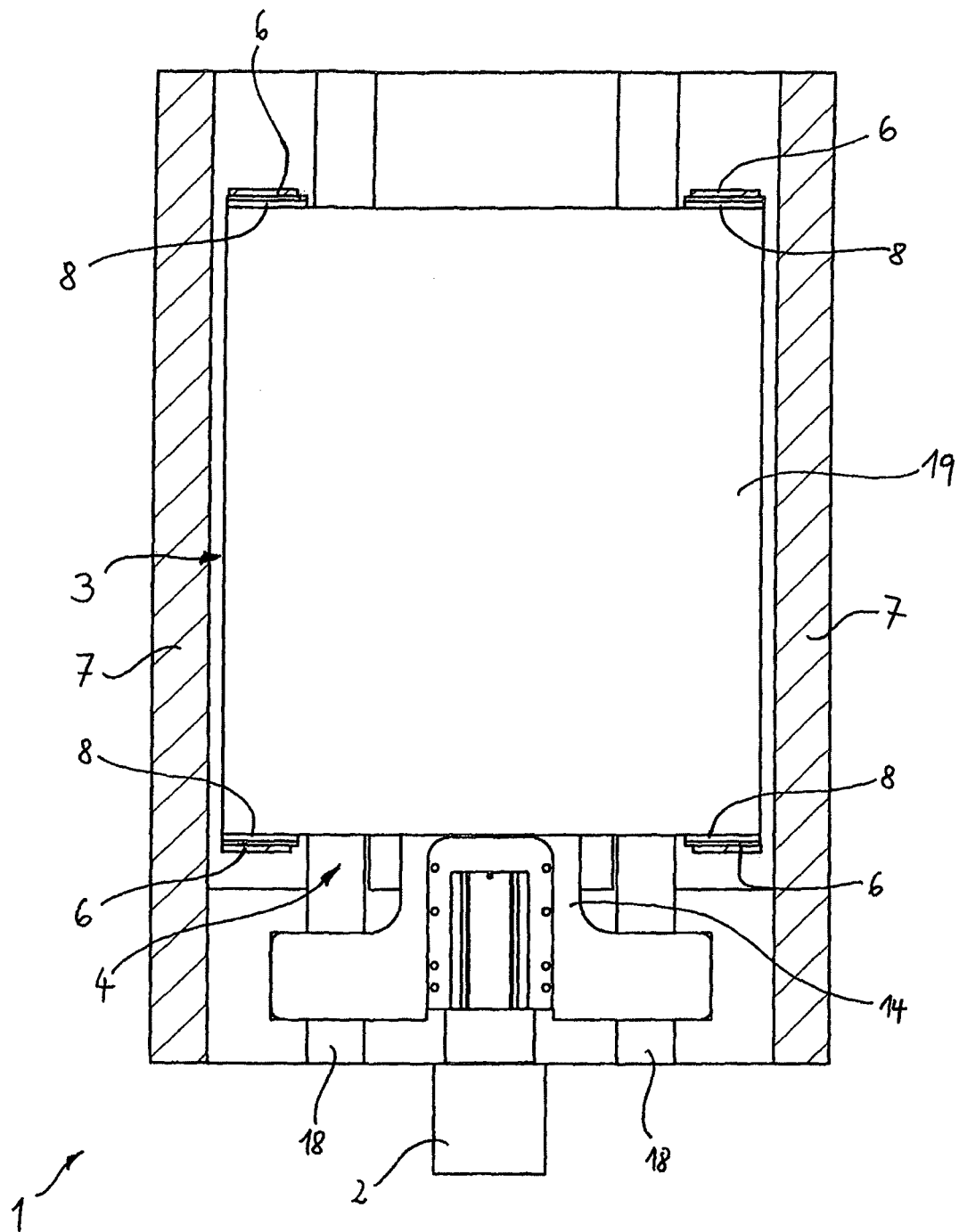
B-B   *Fig. 3*

PRODUCTION MACHINE FOR NON-CIRCULAR WORK PIECES

BACKGROUND

The invention relates to a production machine for non-circular work pieces, in particular, an oval turning lathe, with a tool and tool carrier that can move in an oscillating manner and with a compensation body that can move in the opposite direction relative to this tool and used for impulse decoupling, wherein the movement of the tool can be triggered or realized by a drive acting between the tool carrier and compensation body.

Such production machines are known, for example, from DE 198 10 996 A1 and are used, in particular, for the high-speed production of non-circular turned parts or, in general, in highly dynamic tool moving units. Here, the impulse decoupling is used for preventing the impacts due to the highly dynamic tool movements from being transmitted in their full intensity to the housing or to the mounting on the housing, which would result in a negative influence on the processing accuracy.

From M. Weck, J. Hennig: Entwicklung und Einsatz einer hoch-dynamischen Werkzeugzustelleinheit mit hydrostatischer Lagerung [Development and Use of a Highly Dynamic Tool Feeding Unit with Hydrostatic Bearing], Final Report, Forschungsgemeinschaft Ultrapräzisiontechnik e.V. [Ultra-precision technology research association], Aachen, October 2002, it is known that, for avoiding static friction during the guidance of the tool carrier, the so-called stick-slip effect, aerostatic or hydrostatic guides satisfy the requirements for accuracy and uniformity of the movements, while, due to the highly dynamic response of the system for simultaneously small movement paths, the use of linear bearings is not possible.

Hydrostatic guides, however, require an increased structural expense due to feed lines, supply devices, and measures for preventing leaks. Due to this increased structural expense, the production measures are expensive, susceptible to influences during operation under rough environmental conditions, and intensive in terms of maintenance.

SUMMARY

The invention is based on the objective of creating a production machine for non-circular work pieces that has a simple structural configuration.

This objective is met in the invention in that, for a production machine of the type noted above, the tool carrier is supported by rolling bodies, the compensation body is suspended by guide elements on a housing part of the production machine, and the compensation body has a mass that is a multiple of the mass of the tool carrier carrying the tool such that the compensation strokes of the compensation body corresponding to the oscillating movements of the tool carrier are within the range of elastic deformation of the guide elements. Thus, advantageously the compensation strokes can be absorbed by the elastic deformation of the guide elements and additional hydrostatic or aerostatic bearings of the compensation body can be eliminated. The invention takes advantage, in particular, of the surprising knowledge that the stick-slip effect is to be avoided only conditionally for the linear bearing of the compensation body, while the linear bearing of the tool carrier can definitely have static friction, because this can be overcome through corresponding dimensioning of the drive. It has been shown that, namely, for avoiding a negative influence on the processing accuracy due to rebounds, it is sufficient when the compensation body can react without delay to these rebounds. This is achieved in that a linear bearing of the compensation body is provided which is free from static friction. Instead of the otherwise typical hydrostatic or aerostatic linear bearing, for the invention a suspension of the compensation body by guide elements on a housing part is proposed, wherein the guide elements can be deformed elastically for compensation strokes within a certain stroke magnitude. Through the construction of the mass ratios of compensation bodies and moving parts, that is, tool with tool carrier, it is advantageously achieved that the strokes of the compensation body are so short that the range of elastic deformability of the guide elements is not exceeded.

According to one advantageous construction of the invention it can be provided that the mass of the compensation body equals at least three times, in particular, at least five times or at least ten times the mass of the tool carrier carrying the tool. Tests have shown that, for the mentioned mass ratio, a sufficient reduction takes place for the strokes of the tool occurring during typical use of the production machine into compensation strokes of the compensation body, so that the compensation strokes are within the range of the elastic deformability of the guide elements. The guide elements therefore realize, on one hand, a guide of the movement of the compensation body and, on the other hand, a restoring force that is opposite the compensation strokes. Other means for the guidance or means for restoring forces can be eliminated.

An especially straight-lined guidance of the compensation movements of the compensation body is achieved when the guide elements have, in the rest position, a shape whose extent in the direction of the compensation strokes is significantly smaller than their extent perpendicular to the direction of the compensation strokes, in particular, less than one tenth of the extent perpendicular to the direction of the compensation strokes. In this way, a preferred deflection direction of the guide elements is specified that agrees with the direction of the compensation strokes. Movements perpendicular to the direction of the compensation strokes are thus prevented in the compensation body, wherein a high accuracy of the movement is achieved with small deviations from a straight line.

It is especially favorable when the guide elements are each mounted on a housing part on two sides of the work plane specified by the compensation strokes and each contact the compensation body between these mounting points. The guide elements can here have an integral or divided construction on the compensation body.

According to one construction of the invention, it can be provided that the guide elements prevent a movement of the compensation body laterally or perpendicular to the direction of the compensation strokes. In this way, for example, the guide elements can have corresponding geometric shapes and/or can contact the compensation body accordingly and/or can be oriented in their position. The prevention of a movement perpendicular to the direction of the compensation strokes is necessary, in order to achieve a defined guidance of the tool carrier and thus of the tool with reference to the work piece that is fixed relative to the housing part.

An especially simple embodiment is produced when the guide elements are constructed partially or exclusively as strip-shaped springs that counteract the deflection of the compensation body caused by the compensation strokes.

According to one construction of the invention it can be provided that each of the guide elements has a flat or bracket-shaped construction and is located in the rest position, essentially in a plane relative to which the direction of the compensation strokes runs perpendicular or transverse, wherein the mounting, the shape, and the orientation of the guide elements make more difficult or prevent their movement and thus a movement of the compensation body in this plane, that is, the compensation body alone is guided. Thus, a simple shape is described through which a prevention of movements of the compensation body is achieved laterally or perpendicular to the direction of the compensation strokes.

A guidance of the compensation strokes of the compensation body is produced with especially small or without deviations from a straight line when the guide elements contact, in pairs, ends of the compensation body lying opposite each other in the direction of the compensation strokes. In this way it is advantageously achieved that the guide elements maintain a largest possible spacing relative to each other in the direction of the compensation strokes, wherein an especially exact angular guidance of the compensation strokes is achieved. Advantageously, it can be provided that the guide elements are preloaded against each other in the rest position. Through this preloading, an especially good guidance of the movement from the beginning of the movement on is achieved.

An even more improved stability relative to lateral deflections of the compensation body is achieved when a pair of guide elements contacts each end of the compensation body, with these elements running parallel to each other with the spacing and acting in parallel. Here, the spacing advantageously extends perpendicular to the direction of the compensation strokes.

According to one construction of the invention, it can be provided that the guide elements are mounted with their ends on a housing part of the production machine and contact the compensation body with a region placed in its middle between the ends of the respective guide element. Alternatively or additionally, it can be provided that the guide elements contact, in pairs, the compensation body with one end, wherein the other, free ends of the guide elements of one pair are directed away from each other, especially pointing in opposite directions, and are mounted on the housing part of the production machine.

For the realization of quicker and more exact strokes of the tool carried by the tool carrier, it can be provided that the drive is a linear motor or a plunger-type armature or the like. Advantageously, here it can be provided that the drive is controlled by a control and regulation loop in which the position of the tool with reference to the work piece and/or the housing part represents one control parameter.

For achieving a favorable mass ratio between the tool carrier and compensation body and consequently for achieving the desired reduction of the strokes of the tool carrier into compensation strokes, it can be provided that the stator or the part of the drive that can be excited by the feeding of current is connected to the compensation body and the permanently excited part of the drive is connected to the tool holder. It has been shown that the part of the drive that can be excited by the feeding of current often has a larger mass than the permanently excited part of the drive, which is why the described arrangement favors the construction of a mass ratio according to the invention between the tool carrier with tool and compensation body.

It is especially favorable when the tool carrier with its added parts has a smallest possible mass, because then the mass of the compensation body overall does not have to be selected disproportionately large. For example, it can be provided that a slide is constructed on the tool carrier, with this slide carrying the permanent magnet of the linear motor. In this way, a compact, mass-saving configuration is produced.

Advantageously it can be provided that the slide is even constructed with lightweight design.

Further reduction of the weight of the tool carrier and added parts is produced when the permanent magnets stiffen the slide. The permanent magnets thus take on a double function and additional reinforcements of the slide for absorbing the electromagnetically introduced propulsive forces can be reduced or even eliminated.

An especially robust, lightweight construction of the permanently excited part of the drive is given when the permanent magnets are covered or connected with a material fit on both sides facing the stator of the linear motor to a cover, advantageously a carbon-fiber plate. Through the carbon-fiber plate, the stability of the entire construction is improved for a simultaneously minimal increase in mass. Through the arrangement of the cover, the surface required for the development of a sufficient electromagnetic propulsive force of the drive is utilized for the stabilization of the slide.

An especially lightweight and simultaneously robust construction of the slide is produced when the intermediate space holding the permanent magnets is encased between the covers with a sealing mass. Through the sealing mass, an additional stabilization of the slide is achieved.

For an increase in the connection stiffness of the slide, it can be provided that the permanent magnets are inserted in a support structure.

A simple and robust guidance of the movements of the tool carrier sufficient for the required accuracy is produced when the rolling bodies contact the slide. Advantageously, the rolling bodies contact a rail connected to the housing part or are connected rigidly to the housing part. The rolling bodies thus form a linear bearing through which the tool carrier is supported on the housing part or on a machine part connected rigidly to this housing part.

According to one construction of the invention it can be provided that the stroke of the oscillation movement of the tool is smaller than the circumference of the rolling body of the linear bearing. It has been shown that for the dimensioning of the rolling bodies required for this purpose, the friction in the linear bearing of the tool carrier does not exceed a measure necessary for the requirements of the accuracy of the movement guidance.

The invention can be used in an especially advantageous way when the stroke of the oscillation movement equals 0.01 mm to 45 mm and simultaneously the compensation stroke does not exceed 2 mm.

BRIEF DESCRIPTION OF THE PREFERRED EMBODIMENTS

The invention will now be described in more detail with reference to an embodiment, but is not limited to this embodiment. Other embodiments are produced by the combination of the claims with each other and/or with features of the embodiment.

Figure 2:
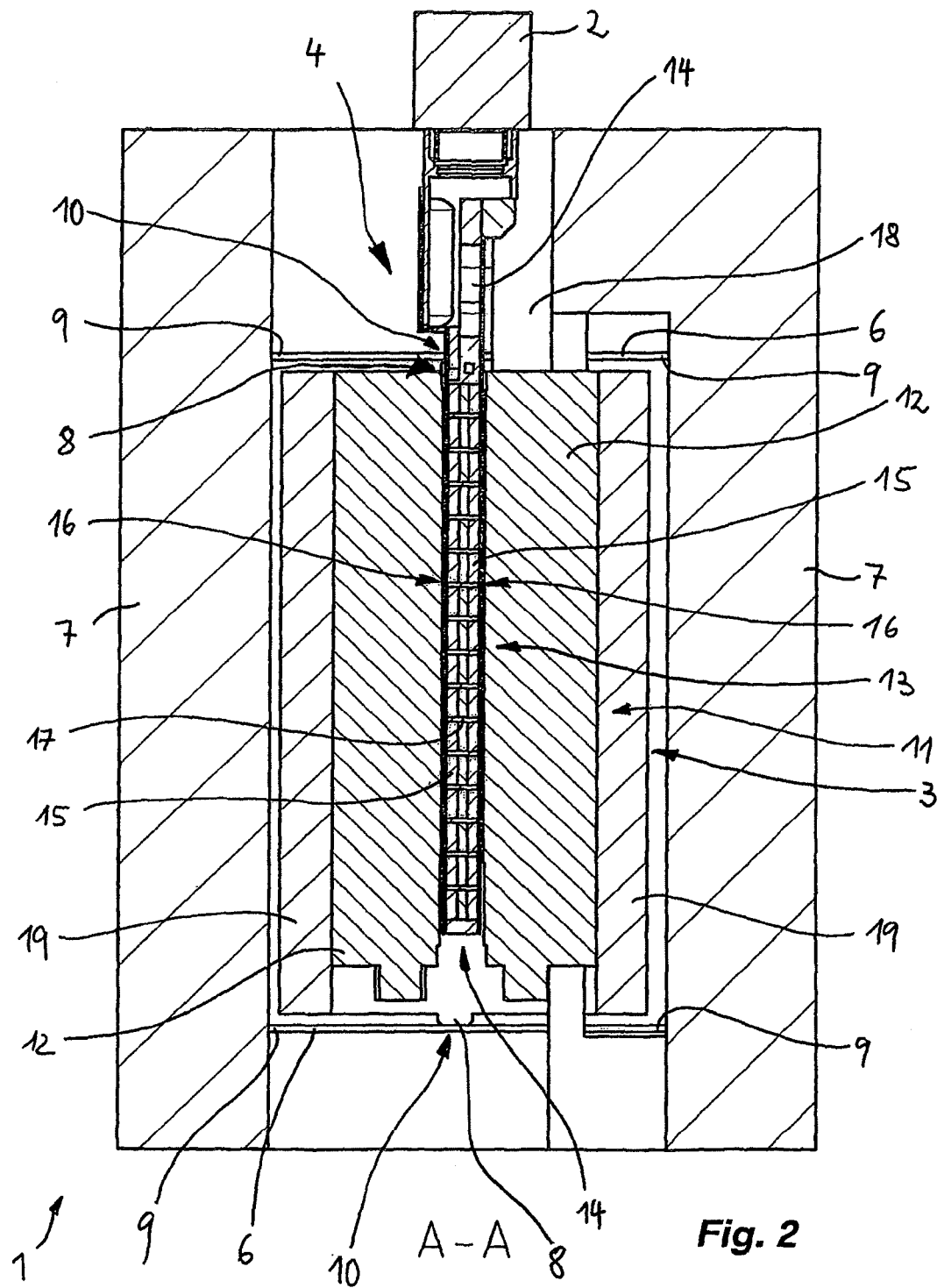

Shown are:

FIG. 1 a tool feeding unit of a production machine with front view of the tool carrier, FIG. 2 is a section view along the line A-A of the tool feeding unit from FIG. 1, and FIG. 3 is a section view along the line B-B of the tool feeding unit from FIG. 1.

DETAILED DESCRIPTION OF THE PREFERRED EMBODIMENTS

A tool feeding unit designated as a whole with 1 in a production machine for non-circular work pieces has a tool carrier 2 that is constructed for holding a tool and can move in an oscillating manner.

A compensation body 3 is used for the impulse decoupling, wherein the movement of the tool can be triggered or realized by a drive 4 acting between tool carrier 2 and compensation body 3. Through the accelerations of the tool carrier 2 triggered or forced by the drive 4, recoils are produced that are absorbed by corresponding movements of the compensation body 3. These recoils thus do not act on other components of the production machine and thus cannot have a negative influence on the processing accuracy.

The tool carrier 2 includes several components, is connected to several components and is supported by rolling bodies 5 and guided such that only one degree of freedom for movement remains, namely the advance of the tool clamped on the tool carrier 2.

The compensation body 3 is suspended by guide elements 6 on a housing part 7 of the tool moving unit 1 and thus of the production machine.

The compensation body 3 is assembled from several components and has a mass that equals a multiple of the mass of the tool carrier 2 carrying the tool.

The guide elements 6 are designed as strip-shaped springs that are located, in the rest position, essentially in a plane relative to which the direction of the compensation strokes runs perpendicular. The direction of the compensation strokes and also the direction of the advancing strokes of the tool carrier run perpendicular to the plane of the drawing in FIG. 1.

Thus, a work plane standing horizontal and perpendicular to the plane of the drawing is defined in FIG. 1 in which the center axis of the tool carrier is located and the guide elements are each mounted on the housing part on both sides of this plane, that is, above and below this plane. The compensation body 3 is therefore arranged and suspended between the upper and lower mounting points of each guide element 6.

In the section view according to FIG. 2 it is clear that the guide elements 6 contact, in pairs, ends 8 of the compensation body 3 that are opposite each other in the direction of the compensation strokes that runs in the plane of the drawing in FIG. 2. In this way, the compensation body 3 is suspended on the housing part 7.

In FIG. 1 it is shown that the guide elements 6 run in pairs parallel to each other with spacing therebetween and act in parallel. In particular, for a pair of guide elements 6, each guide element contacts a lateral, outer end of the compensation body 3 with reference to the compensation strokes.

FIG. 3 shows that, in this way, each guide element 6 is connected to a corner of the compensation body 3 having a rectangular basic shape.

In FIG. 2 it is shown that the guide elements 6 are mounted with their ends 9 on a housing part 7 of the tool feeding unit 1 and thus the production machine and are connected with the compensation body 3 with a region 10 placed in their middle between the ends 9 of each guide element 6. The free ends 9 of the guide elements 6 not directly connected with the compensation body 3 thus point away from each other in opposite directions and are mounted for suspension on the housing part 7 of the production machine 1.

In the section diagram according to FIG. 2, the linear motor 11 is visible that forms the drive 4 for the movement of the tool carrier 2.

The stator 12 of the linear motor 11 is component of the compensation body 3 and contributes to its mass.

In contrast, the permanently excited part 13 of the drive 14 is connected rigidly to the tool carrier 2.

Thus, through a current flowing through the stator 12, a deflection of the permanently excited part 13 is caused from which results an advance of the tool carrier 2.

For holding the permanently excited part 13 of the drive 4, a slide 14 is constructed that carries the permanent magnets 15 of the linear motor 11 and on which the tool carrier 2 is mounted.

The slide 14 is constructed with a lightweight design, wherein the permanent magnets 15 stiffen the slide 14 and are covered with a cover 16 made from a carbon-fiber composite material on both sides facing the stator 12 of the linear motor 14.

The intermediate space 17 holding the permanent magnets 15 between the covers 16 is also encased with a sealing compound and causes a material-bonded connection of permanent magnets 15 and cover 16.

For increasing the connection stiffness of the slide 14, a lattice-like support structure that is not visible further is constructed in the slide 14.

In FIG. 1, it is shown that the slide 14 is supported in that the rolling bodies 5 contact it. The rolling bodies 5 here roll on a rail block 18 and guide the slide in the direction of the work strokes of the tool carrier 2.

The diameter of the rolling bodies 5 is selected so that the stroke of the oscillation movement of the tool is smaller during operation of the production machine 1 than the circumference of the rolling bodies 5 of the linear bearing. The rolling bodies 5 thus do not complete entire revolutions during operation of the tool carrier 2, but instead oscillate practically on a fixed point. In the section view according to FIG. 2, it is shown that the rail blocks 18 are mounted on a part of the housing part 7 that extends like a bridge into the receptacle space of the compensation body 3, wherein the direction of extension runs parallel to the direction of the compensation strokes of the compensation body 3, and traverses a hollow space designed on the compensation body 3.

From FIG. 2 it is clear that the compensation body 3 is assembled essentially from a frame 19 with rectangular outer cross section and constructed with hollow interior and from the stator assembly 12 of the linear motor mounted in this frame 19. The mass of the compensation body 3 is thus essentially determined by the mass of the stator 12 and the mass of the frame 19.

In the production machine for non-circular work pieces, a tool moving unit 1 is provided that has a tool carrier 2 for holding the tool and a compensation body 3 for impulse decoupling, wherein the working movement of the tool carrier 2 can be caused by a drive 4 acting between tool carrier 2 and compensation body 3. It is suggested to support the tool carrier 2 by rolling bodies 5 and to suspend the compensation body 3 by elastically deformable guide elements 6 on a housing part 7 of the tool moving unit 1, wherein the mass of the compensation body 3 is larger than the mass of the tool carrier 2 carrying the tool, such that the working movements of the tool carrier 2 cause compensation strokes of the compensation body 3 that lie only in the range of the elastic deformability of the guide elements 6. The guide elements 6 thus cause guidance and return movement of the compensation body 3.

The invention claimed is:

1. Production machine for non-circular work pieces, comprising a tool and a tool carrier (2) that can move in an oscillating manner and a compensation body (3) that can move in an opposite direction relative to the tool that is used for impulse decoupling, movement of the tool is triggered or realized by a drive (4) acting between the tool carrier (2) and the compensation body (3), the drive (4) is a linear motor (11) or a plunger-type armature, the tool carrier (2) is supported by rolling bodies (5), the compensation body (3) is suspended by guide elements (6) on a housing part (7) of the production machine (1), and the compensation body (3) has a mass that is a multiple of a mass of the tool carrier (2) carrying the tool such that compensation strokes of the compensation body (3) corresponding to the oscillating movements of the tool carrier (2) lie in a range of an elastic deformation of the guide elements (6), a slide (14) that carries permanent magnets (15) of the linear motor (11) is mounted on the tool carrier (2), and the permanent magnets (15) are at least one of covered or connected with a material bond on both sides facing the stator (12) of the linear motor (11) with a cover (16), and an intermediate space (17) holding the permanent magnets (15) between the covers (16) is plugged with a sealing compound.

2. Production machine according to claim 1, wherein the mass of the compensation body (3) equals at least three times the mass of the tool carrier (2) carrying the tool.

3. Production machine according to claim 1, wherein the guide elements (6) have, in a rest position, a shape whose extent in a direction of the compensation stroke is significantly less than an extent thereof perpendicular to a direction of the compensation stroke.

4. Production machine according to claim 3, wherein the guide elements (6) prevent a movement of the compensation body (2) laterally or perpendicular to the direction of the compensation strokes.

5. Production machine according to claim 3, wherein the guide elements (6) are constructed partially or exclusively as strip-shaped springs that counteract a deflection of the compensation body (2) realized by the compensation strokes.

6. Production machine according to claim 1, wherein each of the guide elements (6) has a flat or bracket-shaped construction and is located, in a rest position, essentially in one plane relative to which a direction of the compensation strokes runs perpendicular or transverse.

7. Production machine according to claim 1, wherein the guide elements (6) contact ends (8) of the compensation body (2) lying opposite each other in a direction of the compensation strokes.

8. Production machine according to claim 7, wherein a pair of the guide elements (6) are connected with each of the ends of the compensation body (2), and the guide elements extend with a spacing parallel to each other and act in parallel.

9. Production machine according to claim 1, wherein the guide elements (6) are mounted with their ends (9) on a housing part (7) of the production machine (1) and are connected with the compensation body (3) with an area (10) placed in a center between the ends (9) of each of the guide elements (6).

10. Production machine according to claim 1, wherein the guide elements (6) each connect with the compensation body (3) in pairs with one end, wherein the other, free ends (9) of the guide elements (6) of one pair point away from each other and are mounted on the housing part (7) of the production machine (1).

11. Production machine according to claim 1, wherein a stator or the part of the drive (4) with the compensation body (3) that can be excited by a feeding of current, and a permanently excited part (13) of the drive (4) are connected to the tool holder (2).

12. Production machine according to claim 1, wherein the slide (14) is constructed with a lightweight design.

13. Production machine according to claim 12, wherein the permanent magnets (15) stiffen the slide (14).

14. Production machine according to claim 1, wherein the permanent magnets (15) are inserted in a support structure.

15. Production machine according to claim 1, wherein the rolling bodies (5) contact the slide (14).

16. Production machine according to claim 1, wherein at least one of the tool carrier (2) or the slide (14) is supported on the housing part (7) or on a part connected rigidly to the housing part (7).

17. Production machine according to claim 1, wherein the rolling bodies are in a linear bearing, and the stroke of the oscillation movement of the tool is less than a circumference of one of the rolling bodies (5) of the linear bearing.

18. Production machine according to claim 1, wherein oscillation strokes between 0.01 mm and 45.00 mm can be carried out, and the compensation stroke does not exceed 2 mm.

* * * * *